(12) United States Patent
Thomsen et al.

(10) Patent No.: US 7,054,617 B2
(45) Date of Patent: May 30, 2006

(54) METHOD AND APPARATUS FOR PROVIDING A MESSAGE CREATION REFERENCE ASSOCIATED WITH A REAL-TIME COMMUNICATION MESSAGE

(75) Inventors: Soeren H. Thomsen, N Richland Hills, TX (US); Steven E. Trine, Keller, TX (US); Kevin C. Mowry, Irving, TX (US)

(73) Assignee: Motorola, Inc., Schaumburg, IL (US)

( * ) Notice: Subject to any disclaimer, the term of this patent is extended or adjusted under 35 U.S.C. 154(b) by 38 days.

(21) Appl. No.: 10/044,589

(22) Filed: Jan. 11, 2002

(65) Prior Publication Data
US 2003/0134616 A1    Jul. 17, 2003

(51) Int. Cl.
*H04M 11/10* (2006.01)

(52) U.S. Cl. .................. 455/412.1; 455/466; 455/566; 370/312; 370/432

(58) Field of Classification Search ................ 455/412, 455/422, 466, 566, 412.1, 412.2, 422.1; 370/312, 370/432; 709/204; 345/751, 752, 758, 864
See application file for complete search history.

(56) References Cited

U.S. PATENT DOCUMENTS

| | | | | |
|---|---|---|---|---|
| 5,695,400 A * | 12/1997 | Fennell et al. | ................ | 463/42 |
| 5,920,826 A * | 7/1999 | Metso et al. | ................ | 455/557 |
| 6,219,045 B1 * | 4/2001 | Leahy et al. | ................ | 345/757 |
| 6,539,421 B1 * | 3/2003 | Appelman et al. | .......... | 709/206 |
| 6,727,916 B1 * | 4/2004 | Ballard | ........................ | 715/758 |
| 2001/0031641 A1 * | 10/2001 | Ung et al. | ................... | 455/456 |
| 2002/0023128 A1 * | 2/2002 | Matsumoto et al. | ........ | 709/204 |
| 2002/0026483 A1 * | 2/2002 | Isaacs et al. | ................ | 709/206 |
| 2002/0087631 A1 * | 7/2002 | Sharma | ...................... | 709/203 |
| 2002/0133611 A1 * | 9/2002 | Gorsuch et al. | ............ | 709/231 |
| 2002/0163934 A1 * | 11/2002 | Moore et al. | ................ | 370/465 |
| 2002/0177454 A1 * | 11/2002 | Karri et al. | ................. | 455/466 |
| 2002/0184391 A1 * | 12/2002 | Phillips | ...................... | 709/248 |
| 2002/0194278 A1 * | 12/2002 | Golan | ........................ | 709/206 |
| 2003/0003953 A1 * | 1/2003 | Houplain | ..................... | 455/553 |

* cited by examiner

*Primary Examiner*—William Trost
*Assistant Examiner*—James D Ewart
(74) *Attorney, Agent, or Firm*—Hisashi D. Watanabe

(57) ABSTRACT

A communication system provides real-time communication service such as instant messaging service and group chat service to a plurality of subscribers. The plurality of subscribers generates a plurality of real-time communication messages during a real-time communication session. The mobile station generates a message creation reference associated with a real-time communication message composed by one of the plurality of subscribers. The mobile station transmits the message creation reference and the real-time communication message so that the real-time communication message is arranged relative to the plurality of real-time communication messages during the real-time communication session based on the message creation reference.

20 Claims, 4 Drawing Sheets

---

500

```
SUBSCRIBER #1: WHERE ARE YOU GOING FOR THANKSGIVING?
                                              ~510

SUBSCRIBER #2: AT THE IN-LAWS IN SAN FRANCISCO.
                                        ~520

SUBSCRIBER #3: I'LL BE VISITING MY PARENTS IN PHOENIX.
                                                  ~530

SUBSCRIBER #1: WHERE ARE YOU GOING FOR NEW YEAR'S EVE?
                                                 ~540

SUBSCRIBER #2: I'LL BE SKIING IN VAIL.~550

SUBSCRIBER #3: PARTYING IN LAS VEGAS.~560
```

FIG. 5     500

SUBSCRIBER #1: WHERE ARE YOU GOING FOR THANKSGIVING? ~510

SUBSCRIBER #2: AT THE IN-LAWS IN SAN FRANCISCO. ~520

SUBSCRIBER #3: I'LL BE VISITING MY PARENTS IN PHOENIX. ~530

SUBSCRIBER #1: WHERE ARE YOU GOING FOR NEW YEAR'S EVE? ~540

SUBSCRIBER #2: I'LL BE SKIING IN VAIL. ~550

SUBSCRIBER #3: PARTYING IN LAS VEGAS. ~560

SUBSCRIBER #1: WHERE ARE YOU GOING FOR THANKSGIVING? ~510

SUBSCRIBER #2: AT THE IN-LAWS IN SAN FRANCISCO. ~520

SUBSCRIBER #3: I'LL BE VISITING MY PARENTS IN PHOENIX. ~530

*SUBSCRIBER #4: I'M NOT GOING ANYWHERE.* ~670

SUBSCRIBER #1: WHERE ARE YOU GOING FOR NEW YEAR'S EVE? ~540

SUBSCRIBER #2: I'LL BE SKIING IN VAIL. ~550

SUBSCRIBER #3: PARTYING IN LAS VEGAS. ~560

METHOD AND APPARATUS FOR PROVIDING A MESSAGE CREATION REFERENCE ASSOCIATED WITH A REAL-TIME COMMUNICATION MESSAGE

FIELD OF THE INVENTION

The present invention relates generally to wireless communication systems, and more particularly, to a method and an apparatus such as a mobile station for providing message creation references to arrange real-time communication messages.

BACKGROUND OF THE INVENTION

A wireless communication is a complex network of systems and elements. Typically elements include (1) a radio link to the mobile stations (e.g., cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller or switch, typically a call agent (i.e., a "softswitch"), for routing calls within the system, and (5) a link to the land line or public switch telephone network (PSTN), which is usually also provided by the call agent.

For many people, the Internet has provided alternative ways of communication. In particular, electronic mail messages (i.e., e-mail) have replaced traditional letters and sometimes voice calls as the way of communicating. However, e-mail may not provide a response fast enough in certain circumstances. Further, multiple exchanges of e-mails may require a number of steps to read, reply, and send the e-mails back and forth. Accordingly, real-time communication service such as instant messaging (IM) service and group chat service is becoming a communication mechanism to substitute for e-mail. For example, instant messaging service permits a subscriber to determine whether other subscribers such as friends or co-workers are on-line, and if so, to communicate with each other in "real time" over the Internet. Under most circumstances, real-time communication is "instant." Even during peak traffic periods of the Internet, the delay of real-time communication is typically less than a few seconds. Thus, subscribers may have a real-time on-line "conversation" by exchanging messages with each other (i.e., sending messages back and forth). For example, parents may be able to "talk" with their children who are attending college or working in other cities, states, or countries via real-time communication service. As a result, real-time communication service may even replace voice calls because of cost and convenience.

One aspect of designing a wireless communication system is to provide real-time communication service to mobile stations, i.e., wireless devices such as cellular telephones, pagers, and electronic planners. However, some messages may appear asynchronously (i.e., out of sequence) during a real-time communication session because of different response time by participants of the session. That is, some participants may operate a mobile station with a slow connection to the Internet. Further, a response from a "slow-responding" participant may arrive after other participants have moved on to another topic. To illustrate this concept, the following is a group chat session between Subscribers #1–#4:

Subscriber #1: Where are you going for Thanksgiving?
Subscriber #2: At the in-laws in San Francisco.
Subscriber #3: I'll be visiting my parents in Phoenix.
Subscriber #1: Where are you going for New Year's Eve?
Subscriber #2: I'll be skiing in Vail.
Subscriber #3: Partying in Las Vegas.
Subscriber #4: I'm not going anywhere.

In the above example, Subscriber #4 may have a slow Internet connection and/or responded after Subscriber #1 asked the second question. As a result, Subscribers #1–#3 may not know whether Subscriber #4 is responding to the first question or the second question from Subscriber #1 based on the time of arrival and/or the content of the message from Subscriber #4.

Therefore, a need exists for a method and an apparatus to provide a message creation reference associated with a real-time communication message so that a plurality of real-time communication messages may be arranged in a sequential order.

BRIEF DESCRIPTION OF THE DRAWINGS

FIGS. 5 and 6 are visual representations of a real-time communication session in accordance with the preferred embodiments of the present invention.

FIG. 7 is a flow diagram representation of a method for arranging real-time communication messages in accordance with the preferred embodiments of the present invention.

DETAILED DESCRIPTION OF THE PREFERRED EMBODIMENTS

The present invention provides a method and an apparatus (e.g., a mobile station) for arranging real-time communication messages in a communication system. The communication system provides real-time communication service such as instant messaging service and group chat service to a plurality of subscribers. The mobile station generates a message creation reference (MCR) associated with a real-time communication message (e.g., an instant messaging message and a group chat message) composed by one of the plurality of subscribers. For example, the MCR may be, but is not limited to, a time stamp, i.e., when a subscriber began to compose a real-time communication message. The MCR may be based on an incoming message parameter associated with an incoming message from one of the plurality of subscribers To illustrate this concept, the MCR may be, but is not limited to, an incoming message identifier, a subscriber identifier, and a hash value based on the incoming message parameter. The incoming message parameter may be, but is not limited to, an incoming message number and a portion of incoming message content associated with an incoming message. For example, the mobile station may generate a time stamp associated with an instant messaging message in response to a user input via a user-input device such as an alphanumeric keypad, a numeric keypad, a touch-sensitive display and a microphone. Accordingly, the mobile station transmits the MCR and the real-time communication message so that the real-time communication message is arranged relative to the plurality of real-time communication messages during a real-time communication session based on the MCR. Therefore, the plurality of real-time communication messages is in a sequential order.

Figure 1:
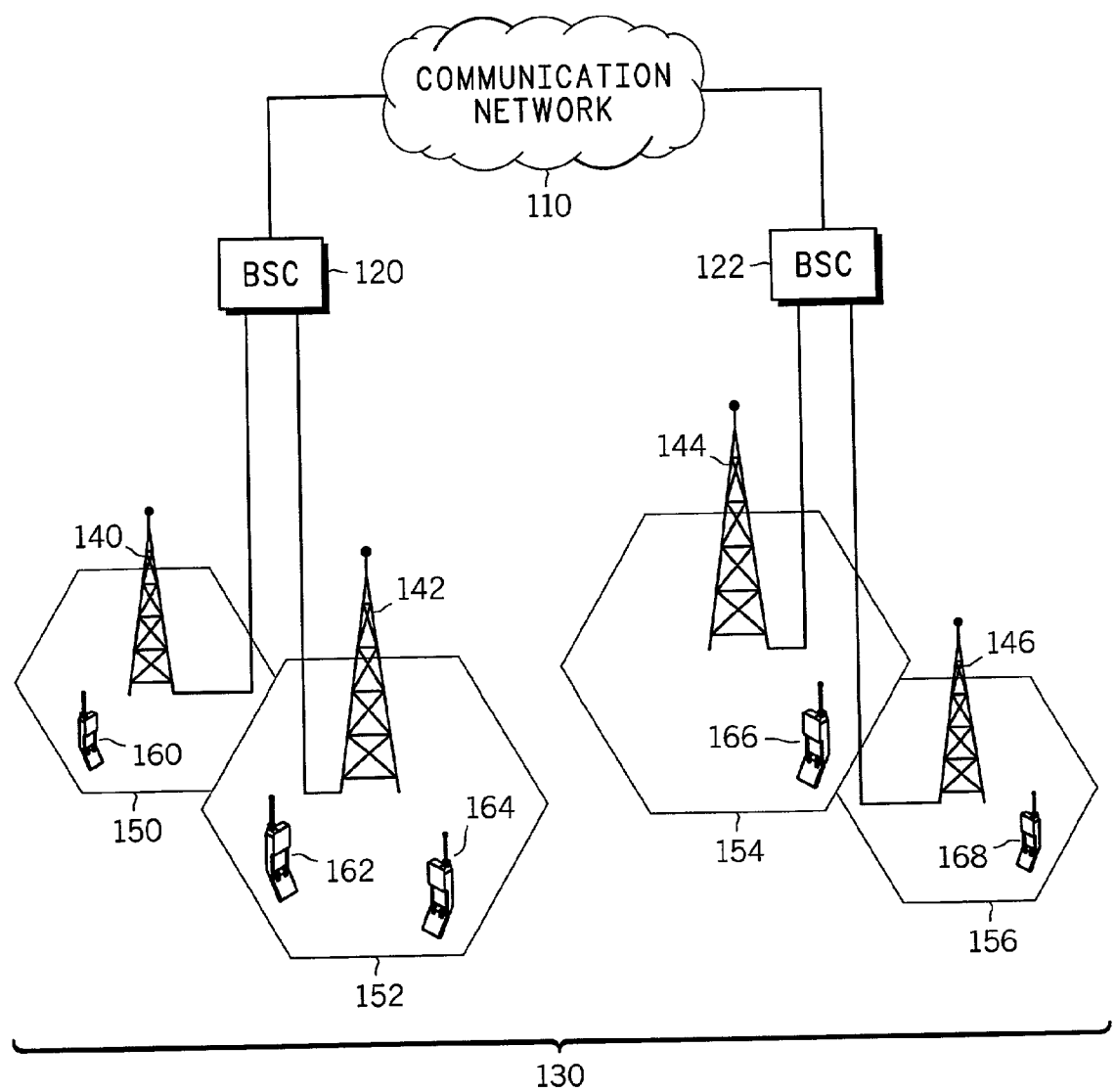
FIG. 1 is a block diagram representation of a wireless communication system that may be adapted to operate in accordance with the preferred embodiments of the present invention.

A communication system in accordance with the present invention is described in terms of several preferred embodiments, and particularly, in terms of a wireless communication system operating in accordance with at least one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communication (GSM), the IS-55 Time Division Multiple Access (TDMA) digital cellular, the IS-95 Code Division Multiple Access (CDMA) digital cellular, CDMA 2000, the Personal Communications System (PCS), 3G and variations and evolutions of these protocols. As shown in FIG. 1, a wireless communication system 100 includes a communication network 110, a plurality of base station controllers (BSC), generally shown as 120 and 122, servicing a total service area 130. The wireless communication system 100 may be, but is not limited to, a frequency division multiple access (FDMA) based communication system, a time division multiple access (TDMA) base communication system, and a code division multiple access (CDMA) based communication system. As is known for such systems, each BSC 120 and 122 has associated therewith a plurality of base station (BS), generally shown as 140, 142, 144, and 146, servicing communication cells, generally shown as 150, 152, 154, and 156, within the total servicing area 130. The BSCs 120 and 122, and BSs 140, 142, 144, and 146 are specified and operate in accordance with the applicable standard or standards for providing wireless communication services to mobile stations (MS), generally shown as 160, 162, 164, 166, and 168 operating in communication cells 150, 152, 154, and 156, and each of these elements are commercially available from Motorola, Inc. of Schaumburg, Ill.

Figure 2:
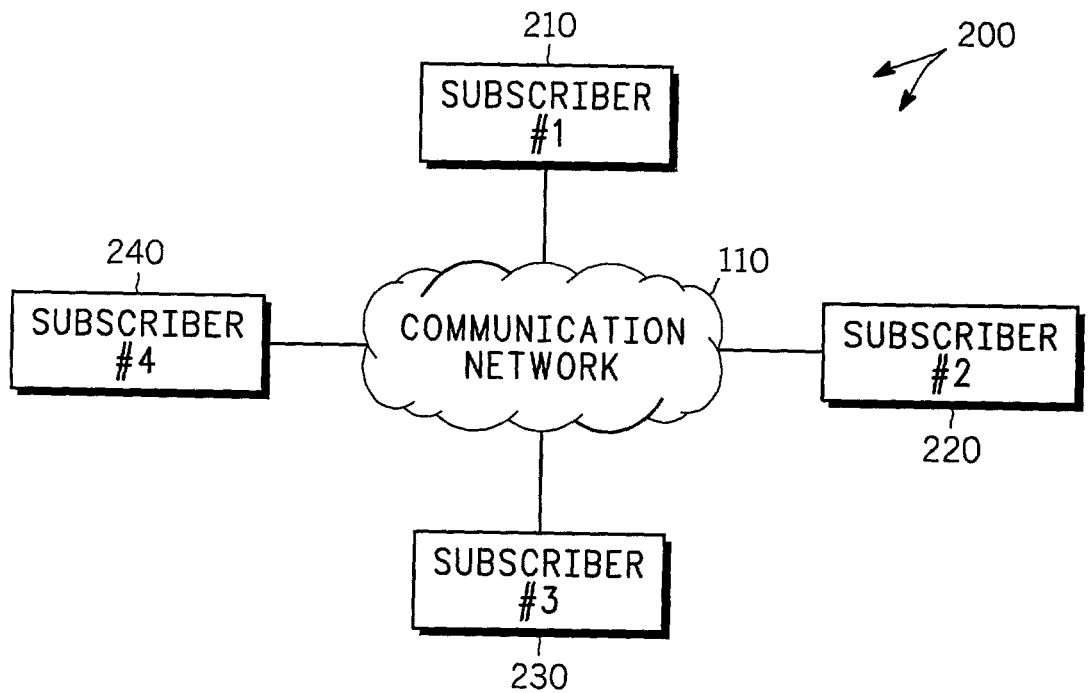
FIG. 2 is a block diagram representation of a communication network that may be adapted to operate in accordance with the preferred embodiments of the present invention.

Referring to FIG. 2, the communication network 110 may be, but is not limited to, an Internet Protocol (IP) network such as a General Packet Radio Services (GPRS) network. The communication network 110 is operable to provide real-time communication service such as instant messaging service and group chat service to a plurality of subscribers 200, generally shown as Subscriber #1 210, Subscriber #2 220, Subscriber #3 230, and Subscriber #4 240. For example, the communication network 110 provides exchange of, but not limited to, text-only messages between the plurality of subscribers 200.

A basic flow for arranging a plurality of real-time communication messages generated by the plurality of subscribers 200 that may be applied with the preferred embodiment of the present invention shown in FIG. 2 may start with a subscriber (e.g., Subscriber #4 240) composing a real-time communication message. A message creation reference (MCR) associated with the real-time communication message is generated. The MCR may be, but is not limited to, a time stamp that indicates when the subscriber began to compose a real-time communication message. Further, the MCR may be based on an incoming message from another subscriber of a real-time communication session. That is, the MCR may be, but is not limited to, an incoming message identifier, a subscriber identifier, and a hash value based on an incoming message parameter associated with an incoming real-time communication message. The incoming message parameter may be, but is not limited to, an incoming message number and a portion of incoming message content. In particular, the incoming message identifier may be, but is not limited to, a plurality of characters of an incoming message; the subscriber identifier may be associated with the sender of the incoming message; and the hash value may be based on, but not limited to, the content of the incoming message and a hashing algorithm as one of ordinary skill in the art will readily recognize. In response to a subscriber input requesting to send the real-time communication message, both the real-time communication message and the MCR associated with that message are transmitted to the communication network 110. The subscriber input may be, but is not limited to, a user-selectable input via an alphanumeric keypad, a user-selectable input via a numeric keypad, a user-selectable input via a touch-sensitive display, and a voice command via a microphone. For example, Subscriber #1 may press a button an alphanumeric keypad to send the real-time communication message. Accordingly, the MCR associated with the real-time communication message composed by Subscriber #4 240 is transmitted to the communication network 110. In response to the receipt of the message and the MCR, the communication network 110 transmits the message and the MCR to other subscribers such as Subscriber #1 210, Subscriber #2 220, and Subscriber #3 230. As a result, devices operated by the other subscribers may display the real-time communication message composed by Subscriber #4 240 based on the MCR.

In an alternate embodiment, the communication network 110 may generate the MCR. That is, the MCR may be based on a current time and a transmission delay for a message to be transmitted from a subscriber. For example, the communication network 110 may generate a time stamp for a real-time communication message from Subscriber #1. The time stamp may be the current time without the transmission delay.

Figure 3:
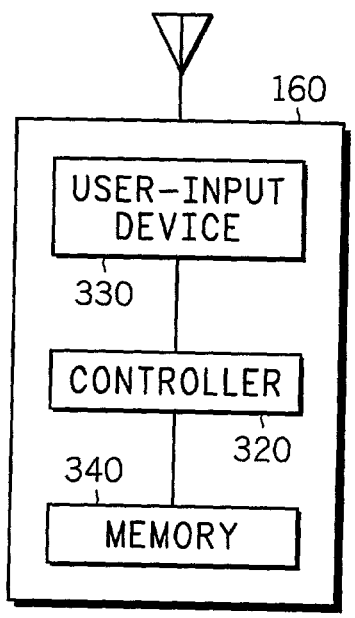
FIG. 3 is a block diagram representation of a mobile station that may be adapted to operate in accordance with the preferred embodiments of the present invention.

Referring to FIG. 3, a device for providing a message creation reference associated with a real-time communication message (e.g., mobile station 160 shown in FIG. 1) generally includes a controller 320, a user-input device 330, and a memory 340. The mobile station 160 may be operable to provide instant messaging service and group chat service to a subscriber (e.g., one of the plurality of subscribers 200 shown in FIG. 2). The controller 320 is operatively coupled to the memory 330, which stores a program or a set of operating instructions. Accordingly, the controller 320 executes the program or the set of operating instructions such that the mobile station 160 operates in accordance with a preferred embodiment of the invention. The program or the set of operating instructions may be embodied in a computer-readable medium such as, but not limited to, paper, a programmable gate array, application specific integrated circuit, erasable programmable read only memory, read only memory, random access memory, magnetic media, and optical media.

Figure 4:
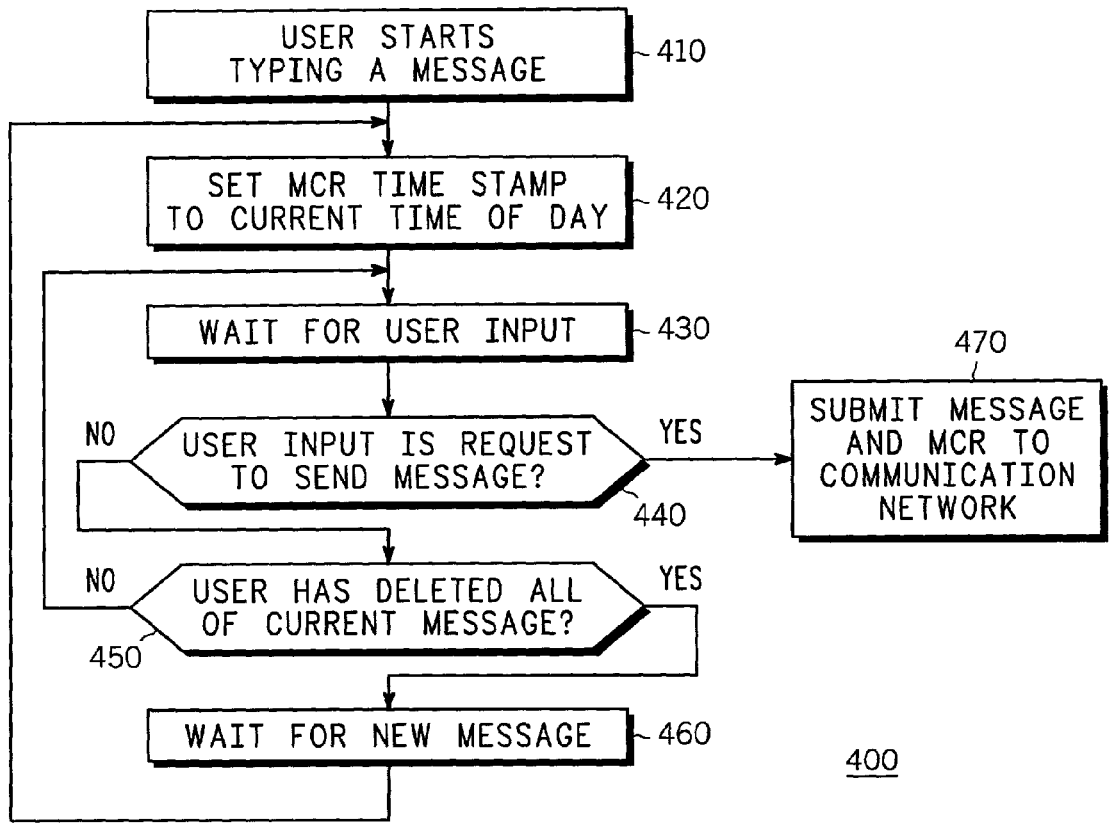
FIG. 4 is a flow diagram representation of a mobile station operating in accordance with the preferred embodiments of the present invention.

A basic flow for providing a message creation reference (MCR) by the mobile station 160 that may be applied with the preferred embodiment of the present invention is shown in FIG. 4. A flow chart 400 of the mobile station 160 providing a MCR associated with a real-time communication message may start at step 410, where a user provides a real-time communication message via the user-input device 330. For example, Subscriber #4 starts typing a real-time communication message via an alphanumeric keypad. At step 420, the controller 320 generates a MCR associated with the real-time communication message generated by the user. To illustrate this concept, the MCR may be, but is not limited to, a time stamp corresponding to the current time, i.e., when the user began to generate the real-time communication message. At step 430, the controller 320 waits for a user input corresponding to a request to transmit the real-time communication message (e.g., waiting for Subscriber #4 to press the "send" button on the user-input device 330). At step 440, the controller 420 determines whether the user input is a request to send the real-time communication message. If the controller 320 determines that the user input is not a request to send the real-time communication message then at step 450, the controller 320 determines whether the user deleted all of the current real-time communication message, i.e., whether the user decided to start all over. If the controller 320 determines that the user did not delete all of the current message then the controller 320 returns to step 430 to wait for a user input to send the real-time communication message. If the user deleted the current message then at step 460, the controller 320 waits for the user to generate a new real-time communication message. For example, a subscriber may decide not to response to a particular message from the other subscribers. Accordingly, the controller 320 returns to step 420 to generate a MCR associated with the new real-time communication message in response to the user generating the new real-time communication message.

Referring back to step 440, if the controller 320 determines that the user input is a request to send the real-time communication message then at step 470, the controller transmits both the real-time communication message and the MCR associated with the real-time communication message to the communication network 110. Accordingly, the communication network transmits both the message and the MCR to other subscribers such as Subscribers #1, #2, and #3 so that the current real-time communication message is arrange relative to a plurality of the real-time communication messages during a real-time communication session. Therefore, the plurality of real-time communication messages is a sequential order based on the MCR associated with each of the plurality of real-time communication messages.

Although step 420 (i.e., generating a MCR associated with a real-time communication message) have been shown and described as being incorporated at the beginning of flow chart 400, step 420 may be incorporated at other points in flow chart 400 as shown in FIG. 4. To illustrate this concept, step 420 may be incorporated after step 440 (i.e., toward the end of flow chart 400) so that a MCR associated with a real-time communication message is generated after the user's request to send the message.

In an alternate embodiment, the MCR may be based on an incoming message from one of the other subscribers of the real-time communication session. That is, the MCR may be, but is not limited to, an incoming message identifier, a subscriber identifier, and a hash value based on an incoming message parameter such as an incoming message number and a portion of incoming message content associated with an incoming message. The incoming message identifier may be a plurality of characters of an incoming message. The subscriber identifier may be associated with the sender of the incoming message. The hash value may be based on the content of the incoming message and a hashing algorithm as one of ordinary skill in the art will readily recognize. For example, the incoming message from Subscriber #1 may be "Where are you going for Thanksgiving?" Thus, the MCR may be a plurality of characters of that incoming message, i.e., "Where are." The MCR may also be a plurality of characters of the subscriber identifier, i.e., "1."

Referring to FIG. 5, a real-time communication session 500 between Subscribers #1, #2, #3, and #4 includes a plurality of real-time communication messages, generally shown as 510, 520, 530, 540, 550, and 560. In particular, Subscriber #1 may transmit a first message 510 to inquire Subscribers #2, #3 and #4 as to where they are going for Thanksgiving. Subscribers #2 and #3 may respond with messages 520 and 530, respectively. Subscriber #1 may transmit a second message 540 to inquire Subscribers #2, #3, and #4 as to where they are going for New Year's Eve with Subscribers #2 and #3 responding with messages 550 and 560, respectively. However, the second message from Subscriber #1 540 may be transmitted prior to a response by Subscriber #4 regarding the first message from Subscriber #1 510.

Figures 6, 7:
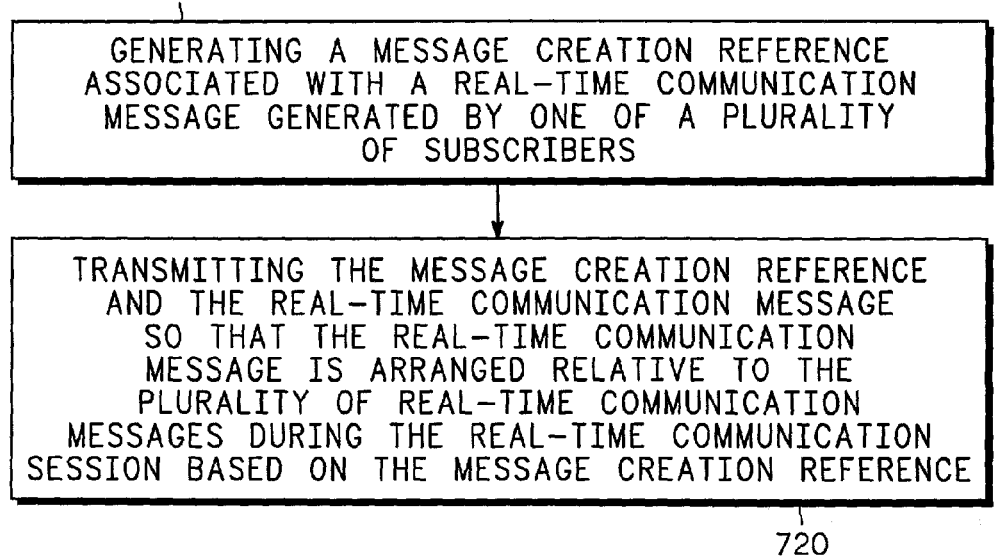

An MCR associated with a message from Subscriber #4 670 may be generated as described above. The communication network 110 may transmit both the message from Subscriber #4 670 and the MCR associated with the message from Subscriber #4 670 to Subscribers #2, #3, and #4 so that the message from Subscriber #4 670 may be arranged relative to the plurality of real-time communication messages based on the MCR associated with the message from Subscriber #4 670. During the real-time communication session 500, for example, a device operated by Subscriber #1 may display incoming messages from Subscribers #2, #3, and #4 (i.e., messages 520, 530, 550, 560 and 670) based on a time stamp associated with each of the incoming messages. Referring to FIG. 6, for example, Subscriber #4 may respond with the message 670 after the second message from Subscriber #1 540 is transmitted. That is, the message from Subscriber #4 670 may be out-of-sequence because Subscriber #1 may receive the message from Subscriber #4 670 after generating the second message 540 but the time stamp associated with the message from Subscriber #4 670 ($TS_{670}$) may be prior to the time stamp associated with the second message from Subscriber #1 540 ($TS_{540}$), i.e., Subscriber #4 may have intended to respond to the first message from Subscriber #1 510 so $TS_{540} > TS_{670}$. As a result, the message from Subscriber #4 670 may be displayed before the second message from Subscriber #1 540 so that the plurality of real-time messages are in a sequential order. Further, the device operated by Subscriber #1 may italicize the message from Subscriber #4 670 to indicate that the message 670 is out-of-sequence, i.e., the message is displayed based on the MCR rather than in the order of receipt.

To avoid excessive reordering of incoming messages, the device operated by Subscriber #1 may use a time window threshold so that incoming messages are reordered if the difference between the time stamp of incoming messages exceeds the time window threshold. To illustrate this concept, the time stamp of the first message from Subscriber #2 520 ($TS_{520}$) may be 1:03 pm, the time stamp of the message from Subscriber #4 670 ($TS_{670}$) may be 1:01 pm, and the time stamp of the second message from Subscriber #1 540 ($TS_{540}$) may be 1:10 pm. For example, if the time window threshold is three minutes then messages 520, 540, and 670 are displayed as shown in FIG. 6. That is, the message from Subscriber #4 670 may be displayed after the first message from Subscriber #2 520 even though the time stamp associated with the message from Subscriber #4 670 is prior to the time stamp associated the message from Subscriber #2 520 because the time window threshold is three minutes (i.e., $TS = TS_{520} - TS_{670} < 3$).

In an alternate embodiment, a communication network (e.g., the communication network 110 as shown in FIG. 1) may be adapted to provide message creation references to arrange real-time communication messages in a sequential order during a real-time communication session. The communication network generally includes a controller and a memory as described above. The communication network may be, but is not limited to an Internet Protocol (IP) network. That is, communication network may generate a MCR such as a time stamp based on the current time and the delay for a real-time communication message sent from a subscriber. The communication network may be operable to arrange a real-time communication message relative to a plurality of real-time communication messages during a real-time communication session based on the MCR. Further, the communication network may assign an order parameter (e.g., a number) corresponding to each real-time communication message based on the MCR. To illustrate this concept, the communication network may assign numbers 1, 2, 3, 4, 5, and 6 to the plurality of real-time communication messages 510, 520, 530, 540, 550, and 560 as shown in FIG. 5, respectively, based on a MCR (e.g., time stamp) associated with each of the plurality of messages (e.g., number 1 corresponds to the first message from Subscriber #1 510, number 2 corresponds to the first message from Subscriber #2 520, number 3 corresponds to the first message from Subscriber #3 530, etc.). Based on the MCR associated with the message from Subscriber #4 670 as shown in FIG. 6, the communication network may assign number 3.5 to the message from Subscriber #4 670 so that the message from Subscriber #4 670 may be arranged between the first message from Subscriber #3 530 and the second message from Subscriber #1 540. Thus, a receiving device operated by one of the subscribers may display the plurality of real-time communication messages in order based on the assigned numbers.

As noted above, a MCR associated with a real-time communication message may be, but is not limited to, an incoming message identifier, a subscriber identifier, and a hash value based on an incoming message parameter associated with an incoming real-time communication message (e.g., an incoming message number and a portion of incoming message content). For example, the MCR associated with the message from Subscriber #4 670 may be a hash value based on the first message from Subscriber #1 510. The message from Subscriber #4 670 may be received "out-of-sequence" if the message from Subscriber #4 670 is received after the second message from Subscriber #1 540 because the hash value associated with the message from Subscriber #4 670 is based on the first message from Subscriber #1 510 (i.e., the hash value is not based on the second message from Subscriber #1 540). Thus, the plurality of real-time communication messages is in order if the message from Subscriber #4 670 is arranged after the first message from Subscriber #1 510 but before the second message from Subscriber #1 540. Further, a real-time communication message may be received "out-of-sequence" if the MCRs associated with other messages are based on that received message. To illustrate this concept, the first message from Subscriber #1 may be received "out-of-sequence" if the first message from Subscriber #1 (i.e., "inquiry" message) received after the first message from Subscriber #2 520, the first message from Subscriber #3 530, and the message from Subscriber #4 670 (i.e., "response" messages) because the MCRs associated with the "response" messages are based on the "inquiry" message. Accordingly, the plurality of real-time communication messages may be in order if the "inquiry" message is arranged prior to the "response" messages.

In accordance with the preferred embodiments of the present invention, and with references to FIG. 7, a method 700 for arranging real-time communication messages in a sequential order during a real-time communication session is shown. Method 700 begins at step 710, where a first device generates a MCR associated with a real-time communication message. The first device may be a wireless device such as, but not limited to, a cellular telephone, a pager, and an electronic planner. At step 720, the first device transmits the MCR and the real-time communication message so that the real-time communication message is arranged relative to the plurality of real-time communication messages during the real-time communication session based on the MCR. In response to receipt of the MCR and the real-time communication message, a second device may be operable to display the real-time communication message from the first device based on the MCR. The second device may be either a wireless electronic device or a wired device such as a desktop computer. The message text may be, but is not limited to, displayed in a font (e.g., italics) different from normal text, displayed in a color (e.g., red or grayed out), and displayed with an icon to indicate that the real-time communication message may be out-of-sequence, i.e., the real-time communication message is displayed based on the MCR rather than in the order of receipt.

Many changes and modifications could be made to the invention without departing from the fair scope and spirit thereof. The scope of some changes is discussed above. The scope of others will become apparent from the appended claims.

What is claimed:

1. In a wireless communication device arranged to receive and display a real-time communication message, a method comprising:

receiving a real-time communication message;

determining a presence of a message creation reference in the real-time communication message, the message creation reference indicative of a message creation event associated with initial creation of the real-time communication message;

sorting the real-time communication message based upon the message creation reference in relation to message creation references associated with other received real-time communication messages; and displaying the real-time communication message in relative position to the other received real-time communication messages.

2. The method of claim 1, wherein the real-time communication message comprises one of an instant messaging message and a group chat message and the step of receiving the real-time communication message comprises receiving the instant messaging message or the group chat message.

3. The method of claim 1, wherein the message creation reference comprises a real-time temporal reference associated associate with creation of the real-time communication message.

4. The method of claim 3, wherein the message creation reference comprises one of a time stamp, a message identifier and a subscriber identifier associated with the real-time communication message.

5. The method of claim 1, wherein the message creation reference comprises a hash value.

6. The method of claim 5, wherein the hash value is associated with the real-time communication message based on an incoming message parameter, the incoming message parameter being associated with a received real-time communication message from one or more wireless communication devices.

7. The method of claim 5, wherein the hash value is associated with the real-time communication message based on one of an incoming message number and a portion of incoming message content, and wherein the incoming message number and the portion of incoming message content are associated with an incoming message from one or more wireless communication, devices.

8. The method of claim 1, wherein the steps of sorting and displaying the received real-time communication message are accomplished without user input.

9. The method of claim 1, wherein the step of sorting the received real-time communication message comprises sorting the real-time communication message relative to a plurality of real-time communication messages received during one of an instant messaging session and a group chat session.

10. A wireless communication device comprising:
a receiver to receive real-time communication messages communicated by one or more communication devices;
a memory
a display,
a controller coupled to the receiver, the memory and the display, the controller being operable responsive to a control program stored in the memory, to process received real-time communication messages to determine a presence in the real-time communication message of a message creation reference and to sort the real-time communication message based upon the message creation reference, the message creation reference being indicative of a message creation event associated with initial creation of the real-time communication message, to cause the real-time communication message to be displayed on the display in relation to other received real-time communication messages.

11. The wireless communication device of claim 10, wherein the real-time communication message comprises one of an instant messaging message and a group chat message and the step of receiving the real-time communication message comprises receiving the instant messaging message or the group chat message.

12. The wireless communication device of claim 10, wherein the message creation reference comprises a real-time temporal reference associated associate with creation of the real-time communication message.

13. The wireless communication device of claim 12, wherein the message creation reference comprises one of a dine stamp, a message identifier and a subscriber identifier associated with the real-time communication message.

14. The wireless communication device of claim 10, wherein the message creation reference comprises a hash value.

15. The wireless communication device of claim 14, wherein the hash value is associated with the real-time communication message based on an incoming message parameter, the incoming message parameter being associated with a received real-time communication message from one or more wireless communication devices.

16. The wireless communication device of claim 14, wherein the hash value is associated with the real-time communication message based on one of an incoming message number and a portion of incoming message content, and wherein the incoming message number and the portion of incoming message content are associated with an incoming message from one or more wireless communication devices.

17. The wireless communication device of claim 10, wherein the processor is operable to son the received real-time communication message relative to a plurality of real-time communication messages received during one of an instant messaging session and a group chat session.

18. The wireless communication device of claim 10, wherein the apparatus comprises one of a cellular telephone, a pager, an electronic planner, and a communication network.

19. The wireless communication device of claim 10, wherein the apparatus comprises one of an Internet Protocol (IP) network and a General Packet Radio Services (GPRS) network.

20. The wireless communication device of claim 10, wherein the processor is operable to sort and to cause the display of the real-time communication message without user input.

* * * * *